No. 697,315. Patented Apr. 8, 1902.
L. J. BERGDOLL.
MEANS FOR INSERTING CORDS OR THE LIKE INTO UNDERGROUND CONDUITS.
(Application filed Jan. 17, 1902.)
(No Model.) 2 Sheets—Sheet 1.

Witnesses
W. A. Williams
Jas. R. Richmond

Inventor
Louis J. Bergdoll
by
Augustus B. Stoughton
Attorney

THE NORRIS PETERS CO., PHOTO-LITHO., WASHINGTON, D. C.

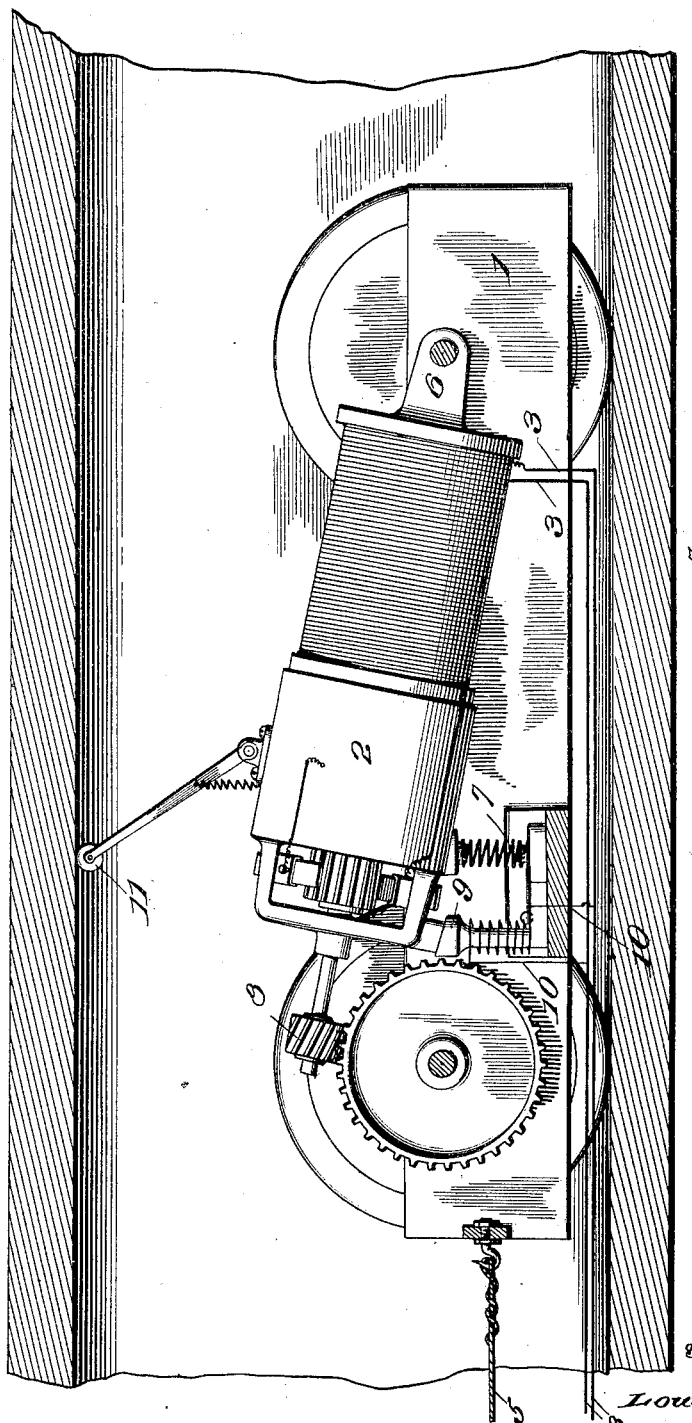

UNITED STATES PATENT OFFICE.

LOUIS J. BERGDOLL, OF PHILADELPHIA, PENNSYLVANIA.

MEANS FOR INSERTING CORDS OR THE LIKE INTO UNDERGROUND CONDUITS.

SPECIFICATION forming part of Letters Patent No. 697,315, dated April 8, 1902.

Application filed January 17, 1902. Serial No. 90,147. (No model.)

*To all whom it may concern:*

Be it known that I, LOUIS J. BERGDOLL, a citizen of the United States, residing at the city of Philadelphia, in the county of Philadelphia and State of Pennsylvania, have invented certain new and useful Means for Inserting a Cord or the Like into Underground Conduits, &c., of which the following is a specification.

One object of the present invention is to provide simple and reliable means for expeditiously and economically inserting a cord or wire through the conduit or conduits.

To this and other ends hereinafter set forth the invention comprises a self-propelled car adapted to run through the conduit and a flexible connection for supplying power to the car, as is hereinafter described; and the invention further comprises the improvements hereinafter set forth and claimed.

The nature, characteristic features, and scope of my invention will be more fully understood from the following description, taken in connection with the accompanying drawings, forming part hereof, and in which—

Figure 2:
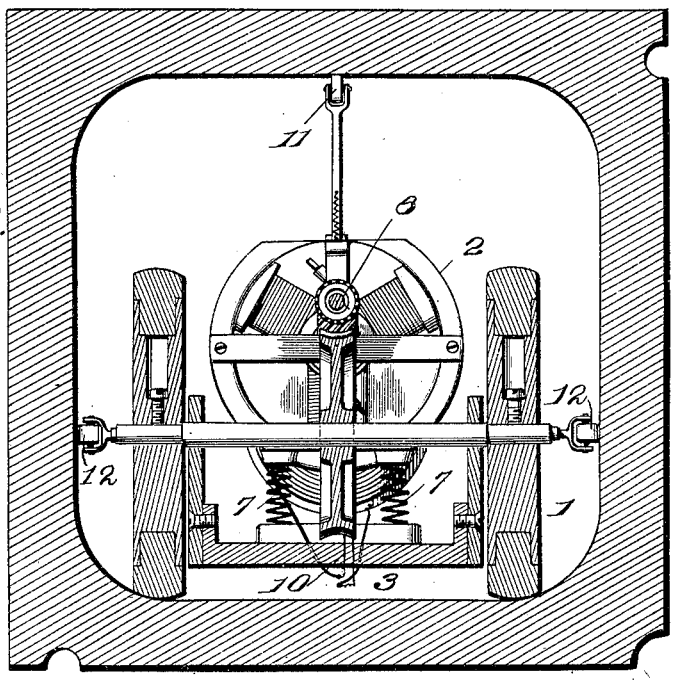
Figure 1:
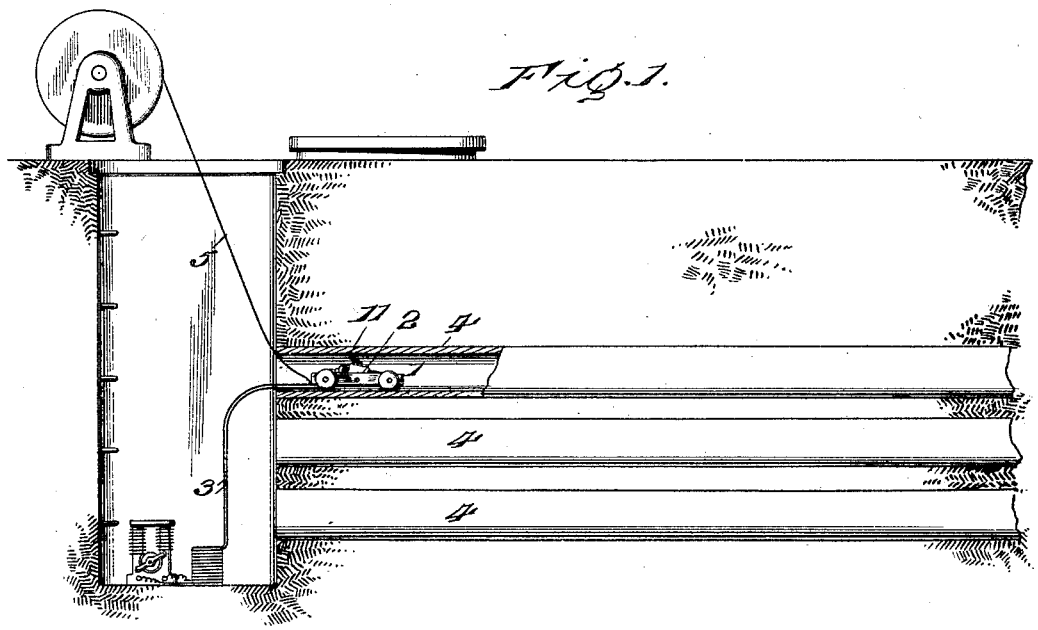

Figure 1 is a longitudinal sectional view illustrating one type of apparatus embodying features of my invention. Fig. 2 is a transverse sectional view of the same drawn to an enlarged scale; and Fig. 3 is a side view, partly in section, of the same.

In the drawings, 1 is a car or truck provided with means for propelling it. As shown, 2 is an electric motor which is geared to the wheels of the car.

3 represents flexible connections by means of which power is supplied to the car, so as to drive it through the conduit 4. These connections 3 may be connected with any suitable source of power.

5 is a cord or wire which is drawn through the conduit by the car and which affords means for drawing the cable through the conduit. Obviously the cord 5 may be omitted and the flexible conductor 3 used as a means for pulling the cable through the conduit. As shown, the motor 2 is carried by a hinged frame 6 and is solicited by a spring 7 into such position that the pinion 8 is out of gear. Under such circumstances the car can be easily pulled backward, if necessary. However, when the circuit through the conductors 3 is closed the magnet 9 is energized by way of the shunt-circuit 10 and operates to overcome the spring 7 and turn the motor-frame so as to bring the pinion 8 into gear in order to drive the car forward.

11 is a wheel pressed by a spring upon one of the walls of the conduit, so as to insure proper contact of the driving-wheels of the car for propelling it, and 12 indicates guide wheels or rollers which are suitably attached to the car and bear upon opposite walls of the conduit.

In use the car 1 is placed through the open end of the conduit and current is supplied to it by the conductors 3, which may be connected with any suitable source of electricity—as, for example, the line-wires which extend along the street. The motor is thus set in motion and as the car travels through the conduit the conductors 3, as well as the tow-cord 5, are played out. Should the travel of the car be interrupted in any way, the current is turned off and the motor is thrown out of gear by the spring 7, so that the car can be pulled backward and restarted, if desired. The cord or wire thus introduced into the conduit affords means for pulling the cable through the conduit in the ordinary way.

It will be obvious to those skilled in the art to which my invention appertains that modifications may be made in detail without departing from the spirit thereof. Hence I do not limit myself to the precise construction and arrangement of parts hereinabove set forth and illustrated in the accompanying drawings; but,

Having thus described the nature and objects of my invention, what I claim as new, and desire to secure by Letters Patent, is—

1. Means for use in introducing a cable into a conduit which comprise a self-propelled car adapted to travel through the conduit, and provided with a pivotally-mounted motor, means for normally disconnecting the motor to permit the car to travel rearward, and power-conductors connected with the car and adapted to be fed into the conduit as the car travels through it, substantially as described.

2. Means for use in introducing a cable into a conduit which comprise a car adapted to traverse the conduit and provided with an electric motor, means for normally disconnecting the motor to permit the car to be drawn backward, and power connections attached to the car and adapted to connect the motor and to drive the car, substantially as described.

3. Means for use in introducing a cable into a conduit which comprise a self-propelled car adapted to traverse the conduit, and provided with an electric motor, means for normally disconnecting the motor to permit the car to travel rearward, wheels applied to said car and adapted to bear upon opposite walls of the conduit, and flexible connections attached to the car, substantially as described.

4. Means for inserting cables into conduits which comprise a self-propelled car adapted to traverse the conduit, and provided with a pivotally-mounted electric motor, means for normally disconnecting the motor to permit the car to travel rearward, and a flexible power connection attached to the car and adapted to be fed into the conduit, substantially as described.

5. Means for inserting cables into conduits, which comprise a self-propelled car adapted to traverse the conduit and provided with a pivotally-mounted electric motor, means for normally disconnecting the motor to permit the car to travel rearward, guide devices attached to the car and arranged to bear upon opposite walls of the conduit, and flexible connections attached to the car and adapted to be fed into the conduit, substantially as described.

6. Means for use in introducing a cable into a conduit, which comprises a car adapted to travel through the conduit and provided with an electric motor, means for normally disconnecting the motor to permit the car to be drawn backward, power-conductors connected with the car and adapted to be fed into the conduit as the car travels through it, and means yieldingly interposed between the car and top of the conduit for insuring proper contact of the driving-wheels, substantially as described.

7. Means for use in introducing a cable into a conduit, which comprise a car adapted to travel through a conduit and provided with an electric motor, means for normally disconnecting the motor to permit the car to be drawn backward, power-conductors connected with the car and adapted to be fed into the conduit as the car travels through it, wheels applied to said car and adapted to bear upon opposite walls of the conduit, and spring-pressed means attached to the car and bearing against the top of the conduit for insuring proper contact of the driving-wheels, substantially as described.

In testimony whereof I have hereunto signed my name.

LOUIS J. BERGDOLL.

In presence of—
  W. J. JACKSON,
  JAS. A. RICHMOND.